US010706352B2

(12) United States Patent
Wang et al.

(10) Patent No.: US 10,706,352 B2
(45) Date of Patent: Jul. 7, 2020

(54) TRAINING ACTION SELECTION NEURAL NETWORKS USING OFF-POLICY ACTOR CRITIC REINFORCEMENT LEARNING

(71) Applicant: DeepMind Technologies Limited, London (GB)

(72) Inventors: Ziyu Wang, St. Albans (GB); Nicolas Manfred Otto Heess, London (GB); Victor Constant Bapst, London (GB)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 16/402,687

(22) Filed: May 3, 2019

(65) Prior Publication Data

US 2019/0258918 A1 Aug. 22, 2019

Related U.S. Application Data

(63) Continuation of application No. PCT/IB2017/001329, filed on Nov. 3, 2017.

(60) Provisional application No. 62/417,235, filed on Nov. 3, 2016.

(51) Int. Cl.
*G06N 3/04* (2006.01)
*G06N 3/08* (2006.01)
*G06N 3/00* (2006.01)

(52) U.S. Cl.
CPC ........... *G06N 3/0454* (2013.01); *G06N 3/006* (2013.01); *G06N 3/0472* (2013.01); *G06N 3/084* (2013.01); *G06N 3/088* (2013.01)

(58) Field of Classification Search
CPC ..... G06N 3/0454; G06N 3/0472; G06N 3/088
See application file for complete search history.

(56) References Cited

U.S. PATENT DOCUMENTS

| 10,152,676 | B1* | 12/2018 | Strom | G06N 3/08 |
| 2014/0025613 | A1* | 1/2014 | Ponulak | G06N 3/08 |
| | | | | 706/25 |
| 2015/0100530 | A1 | 4/2015 | Mnih et al. | |
| 2016/0232445 | A1 | 8/2016 | Srinivasan et al. | |

OTHER PUBLICATIONS

Gu et al. Continuous Deep Q-Learning with Model-based Acceleration. Mar. 2016 (Year: 2016).*

(Continued)

*Primary Examiner* — Alexey Shmatov
*Assistant Examiner* — Robert Bejcek, II
(74) *Attorney, Agent, or Firm* — Fish & Richardson P.C.

(57) ABSTRACT

Methods, systems, and apparatus, including computer programs encoded on a computer storage medium, for training an action selection neural network. One of the methods includes maintaining a replay memory that stores trajectories generated as a result of interaction of an agent with an environment; and training an action selection neural network having policy parameters on the trajectories in the replay memory, wherein training the action selection neural network comprises: sampling a trajectory from the replay memory; and adjusting current values of the policy parameters by training the action selection neural network on the trajectory using an off-policy actor critic reinforcement learning technique.

22 Claims, 6 Drawing Sheets

(56) References Cited

OTHER PUBLICATIONS

Bellemare et al, "The arcade learning environment: An evaluation platform for general agents," arXiv, Jun. 21, 2013, 27 pages.
Brockman et al, "OpenAI Gym," arXiv, Jun. 5, 2016, 4 pages.
Bucilua et al, "Model compression," Cornell University, Aug. 2006, 7 pages.
Degris et al, "Off-policy actor-critic," arXiv, Jun. 20, 2013, 18 pages.
Emami et al [online], Deep deterministic policy gradients in TensorFlow, GitHub.com, Aug. 2016, [retreived on Jun. 13, 2019], retrieved from: URL<https://pemami4911.github.io/blog/2016/08/21/ddpg-rl.html>, 22 pages.
EP Office Action in the European Appln. No. 17818249.9-1221, dated May 8, 2019, 3 pages.
Harutyunyan et al, "Q with off-policy corrections," arXiv, Aug. 11, 2016, 15 pages.
Heess et al, "Leanring continuous control policies by stochastic value gmidents," arXiv, Oct. 30, 2015, 13 pages.
Jie et al, "On a connection between importance sampling and the likelihood ratio policy gradient," Paper NIPS, 2010, 9 pages.
Levine et al, "End-to-end training of deep visuomotor policies," arXiv, Apr. 19, 2016, 40 pages.
Levine et al, "Guided policy search," Proceedings of the 20th ICML, 2013, 9 pages.
Lillicrap et al, "Continous control with deep reinforcement learning," arXiv, Jul. 5, 2019, 14 pages.
Lin et al, "Self-improving reactive agents based on reinforcement learning, planning, and teaching," Machine Learning, May 1992, 29 pages.
Meuleau et al, "Off-policy policy search," Technical report, MIT AI Lab, 2000, 7 pages.
Mnih et al, "Asynchronous methods for deep reinforcement learning," arXiv, Jun. 16, 2016, 19 pages.
Mnih et al, "Human-level control through deep reinforcement learning," Nature, Macmillan Publishers Limited, 2015, 13 pages.
Munos et al, "Safe and efficient off-policy reinforcement learning," arXiv, Jun. 2016, 18 pages.
Narasimhan et al, "Language understanding for text-based games using depe reinforcement learning," arXiv, Sep. 11, 2015, 11 pages.
Oh et al, "Control of memory, active perception, and action in Minecraft," arXiv, May 30, 2016, 22 pages.
PCT International Preliminary Report on Patentability in International Appln. PCT/IB2017/001329, dated Jan. 25, 2019, 14 pages.
PCT International Search Report and Written Opinion in International Appln. PCT/IB2017/001329, dated Mar. 6, 2018, 24 pages.
Precup et al, "Eligibility traces for off-policy evaluations," Semantic Scholar, 2000, 8 pages.
Schaul et al, "Prioritized experience replay," arXiv, Feb. 25, 2016, 21 pages.
Schulman et al, "High-dimensional continuous control using generalized advantage estimation," arXiv, Oct. 20, 2018, 14 pages.
Schulman et al, "Trust region policy optimization," arXiv, Apr. 20, 2017, 16 pages.
Silver et al, "Deterministic policy gradient algorithms," Proceedings of the 31st ICML, 2014, 9 pages.
Silver et al, "Mastering the game of Go with deep neural networks and tree search," Nature, Jan. 2016, 20 pages.
Sutton et al, "Policy gradient methods for reinforcement learning with function approximation," Paper NIPS, 2000, 7 pages.
Todorov et al, "MuJoCo: A physics engine for model-based control," An International Conference on Intelligent Robots and Systems, Oct. 2012, 8 pages.
Wang et al, "Dueling network architectures for deep reinforcement learning," arXiv, Apr. 5, 2016, 15 pages.
Wawrzynski, "Real-time reinforcement learning by sequential actor-critics and experience replay," CiteSeerx, Jun. 2009, 36 pages.
JP Office Action in Japanese Appln. No. 2019-522656, dated May 18, 2020, 8 pages (with English translation).

* cited by examiner

TRAINING ACTION SELECTION NEURAL NETWORKS USING OFF-POLICY ACTOR CRITIC REINFORCEMENT LEARNING

CROSS-REFERENCE TO RELATED APPLICATIONS

This application is a continuation of International Application No PCT/IB2017/001329, filed on Nov. 3, 2017, which claims priority to U.S. Provisional Application No. 62/417,235, filed on Nov. 3, 2016. The disclosures of the prior applications are considered part of and are incorporated by reference in the disclosure of this application.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a reinforcement learning system implemented as computer programs on one or more computers in one or more locations that selects actions to be performed by an agent interacting with an environment. Generally, the system uses an action selection policy neural network in selecting actions to be performed in response to observations characterizing states of the environment. So that the action selection policy neural network can be effectively used to select actions, the system trains the action selection policy neural network on trajectories generated as a result of interactions of the agent with the environment. In particular, the system can sample trajectories from a replay memory and then adjust the current values of the parameters of the neural network by training the neural network on the sampled transitions using an off-policy actor critic reinforcement learning technique.

Thus in one aspect a method, in particular of reinforcement learning, comprises maintaining a replay memory that stores trajectories generated as a result of interaction of an agent with an environment. Each trajectory may comprise respective action selection data at each of a plurality of time steps. The action selection data at each time step may identify one or more of: an observation characterizing a state of the environment, an action performed by the agent in response to the observation, a reward received in response to the agent performing the action, an action selection score assigned to at least the performed action in determining which action to perform in response to the observation. The method may then involve training an action selection neural network having action selection neural network parameters, here referred to as policy parameters, on the trajectories in the replay memory. The action selection neural network is configured to: receive an observation characterizing a state of the environment; and process the observation to generate a network output that defines a score distribution over possible actions that can be performed by the agent in response to the observation. Training the action selection neural network may comprise sampling a trajectory from the replay memory; and adjusting current values of the policy parameters by training the action selection neural network on the trajectory, preferably using an off-policy actor critic reinforcement learning technique.

The set of actions may be finite, defining a discrete action space or a continuous action space which has been discretized, or may be actions in a continuous action space. Where the action space is discrete or discretized the score distribution may be a categorical distribution defined by a probability vector having elements for the possible actions. Where the action space is continuous the score distribution may be defined by one or more parameters of one or more continuous distributions, for example a mean and covariance of a distribution such as a Gaussian distribution.

In broad terms an actor critic technique employs an actor neural network to provide action scores and a critic neural network to provide one or more values for a state or possible action which may be used by the actor neural network. Off-policy learning uses stored experience for learning a policy. Some implementations of off-policy actor critic reinforcement learning techniques are described later.

Some advantages of implementations of the method include faster and more accurate learning.

Where the set of possible actions that can be performed by the agent in response to the observation is finite the network output may comprise the score distribution. Then, adjusting current values of the policy parameters using the off-policy actor critic reinforcement learning technique may comprise, for time steps in the trajectory from the final time step in the trajectory to the initial time step in the trajectory: processing the observation using the action selection neural network to determine a main score distribution; processing the observation using a critic neural network to determine a respective Q value for each of the possible actions; and determining, from the Q values and the main score distribution, a main gradient for the time step. A Q-value may provide a value for an observation-action combination, more particularly an estimate of a future reward were the action to be performed in response to the observation. The main gradient can be used to adjust the values of the policy parameters by gradient ascent or descent, for example by backpropagation through the action selection neural network. The main gradient may be used on its own or, in some examples, in combination with one or more additional gradient terms as described later.

In some implementations determining the main gradient may comprise determining, from the Q values and the main score distribution, a value estimate for each time step in the trajectory. Determining the main gradient may also comprise determining a retrace estimate for the time step. Broadly the retrace estimate comprises an estimate of a target Q value for a time step, in particular an estimate of an optimal Q value that should have been generated by the critic network by processing the observation at the time step. Thus the retrace estimate may comprise a weighted sum of future rewards. The rewards may be weighted to correct for off-policy sampling using the agent's behavior as represented by the stored trajectories. The weighting may implement a form of importance sampling using a ratio of likelihoods of an action determined from the action selection neural network and from the stored trajectory. Thus, for example, the importance sampling may employ an importance weight obtained by dividing the score for action performed at the time step in the main score distribution by the action selection score in the action selection distribution. The value of an importance weight may be capped, e.g., to less than or equal to unity, to determine a truncated importance weight. This limits potentially large importance weight values, reducing importance weight variance.

In some implementations the retrace estimate for a time step may be determined from a current retrace estimate and the reward, for example by scaling the current retrace estimate by a discount factor equal to or less than unity and increasing the result dependent upon the reward. The main gradient may then be determined using a combination of the main score distribution, the Q values, the value estimate, and the retrace estimate, so that each of these is taken into account.

The method may further comprise determining a critic gradient from the Q value for the performed action and the retrace estimate. The method may then determine an update for current values of the parameters of the critic neural network from the critic gradient. The retrace estimate may then be updated.

One or more possible actions that can be performed by the agent in response to the observation may be defined in a continuous action space. The network output may then comprise one or more distribution parameters that define the score distribution over points in the continuous action space. One way of adjusting values of the policy parameters using the off-policy actor critic reinforcement learning technique may then comprise, for time steps in the trajectory from the final time step in the trajectory to the initial time step in the trajectory, processing the observation using the action selection neural network to define a main score distribution. The observation may also be processed using a stochastic dueling neural network to determine both a Q-value for an action in continuous action space and a value estimate for the observation. Thus at a time step the value estimate may be determined for the time step and a Q-value may be determined for the performed action. The Q-value may be stochastic, that is determined by sampling from a distribution, for example a probability distribution over possible actions. This distribution may be defined by the output of the action selection policy neural network. Thus the stochastic dueling neural network may comprise a neural network that is configured to process the observation to generate a deterministic value estimate and a stochastic Q value for the performed action. The stochastic dueling neural network may perform the role of the critic.

The method may then further comprise sampling an alternate action from the main score distribution. A Q-value for the alternate action may then be determined. The alternate action optionally may also be used to determine an alternate importance weight as previously described; the alternate importance weight may be truncated.

A main gradient for the time step may be determined from the Q-value, the deterministic value estimate, the stochastic Q value, the main score distribution, and the sampled action. More particularly the performed action may be used to determine a first gradient term of the main gradient from the stochastic Q value and the alternate action may be used to determine a second gradient term of the main gradient from the Q-value for the alternate action. The first gradient term may be weighted by an importance weight for the performed action; the second gradient term may be weighted by an importance weight for the alternate action. As previously, the main gradient may be supplemented by one or more additional gradient terms as described later. The main gradient for the time step, for updating the action selection neural network by adjusting the policy parameters, may then be determined.

Adjusting current values of the policy parameters may further comprise processing the observation to generate an auxiliary score distribution. This processing may use an average neural network having a plurality of average network parameters and may be in accordance with current values of the average network parameters. As described later, the average neural network may have parameter values which represent a moving average of the policy parameters. The method may thus further comprise determining an auxiliary gradient of a measure, such as a Kullback-Leibler divergence, of a difference between the auxiliary score distribution and the main score distribution. The method may then determine a final gradient from the main gradient and the auxiliary gradient, and then update the current values of the policy parameters from the final gradient. This can help to stabilize learning, in particular by constraining policy parameter updates not to deviate too far from values representing a running average of previous policies.

A scaling factor may be applied to the main gradient to determine the final gradient, that is to reduce the gradient or rate of change of the policy parameters. The scaling factor may be applied conditional upon the auxiliary gradient being greater than a constraint.

In another aspect a method of training a main neural network having a plurality of main network parameters to determine trained values of the main network parameters may comprise optimizing an objective function. Thus the method comprising may comprise receiving a batch of training data comprising a plurality of training examples. Then, for each of the plurality of training examples in the batch, the method may include: processing, using the main neural network in accordance with current values of the main network parameters, the training example to generate a main network output for the training example; determining a main gradient of the objective function from the main network output; processing, using an average neural network having a plurality of average network parameters and in accordance with current values of the average network parameters, the training example to generate an average network output for the training example; determining an auxiliary gradient of a measure of a difference between the average network output and the main network output; determining a final gradient from the main gradient and the auxiliary gradient; and determining an update to the current values of the main network parameters from the final gradient.

Corresponding features to those previously described may also be employed in the context of this method.

Particular embodiments of the subject matter described in this specification can be implemented so as to realize one or more of the following advantages. The subject matter described in this specification introduces an off-policy actor-critic reinforcement learning technique that is stable, sample efficient, and can be applied learn large scale reinforcement learning tasks. In particular, the described techniques can match or exceed the state of the art in both discrete action space tasks and continuous control tasks while remaining stable and sample efficient during learning. In particular, by incorporating truncated importance sampling with bias correction, stochastic dueling network architectures, and efficient trust region policy optimization as described below, the described techniques can effectively train a neural network to select actions to be performed by an agent from a continuous action space. Effectively training a neural network to select actions from a continuous action space can be highly advantageous for complex tasks, e.g., tasks that include controlling a robot or an autonomous vehicle. By maintaining an average network during the training and using the average network to scale gradients before they are applied to the policy parameters, the stability of the training process is improved, resulting in reduced training times and improved performance once the training is completed. More generally, the described average network can be used to improve the stability of the training of any of a variety of different kinds of neural networks, resulting in reduced training times and improved performance once the training is completed.

Applications of the described methods and systems include reinforcement learning tasks where the agent is a robot agent interacting with the environment to accomplish a task or an autonomous or semi-autonomous vehicle navigating through the environment. Alternatively the agent may control actions in an environment comprising items of equipment, for example in a data center or grid mains power or water distribution system, or in a manufacturing plant. Then the observations may comprise observations of power or water usage by equipment, or observations of power generation or distribution control, or observations of usage of a resource or of waste production. The agent may control actions in the environment to increase efficiency and/or reduce the environmental impact of operations in the environment.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
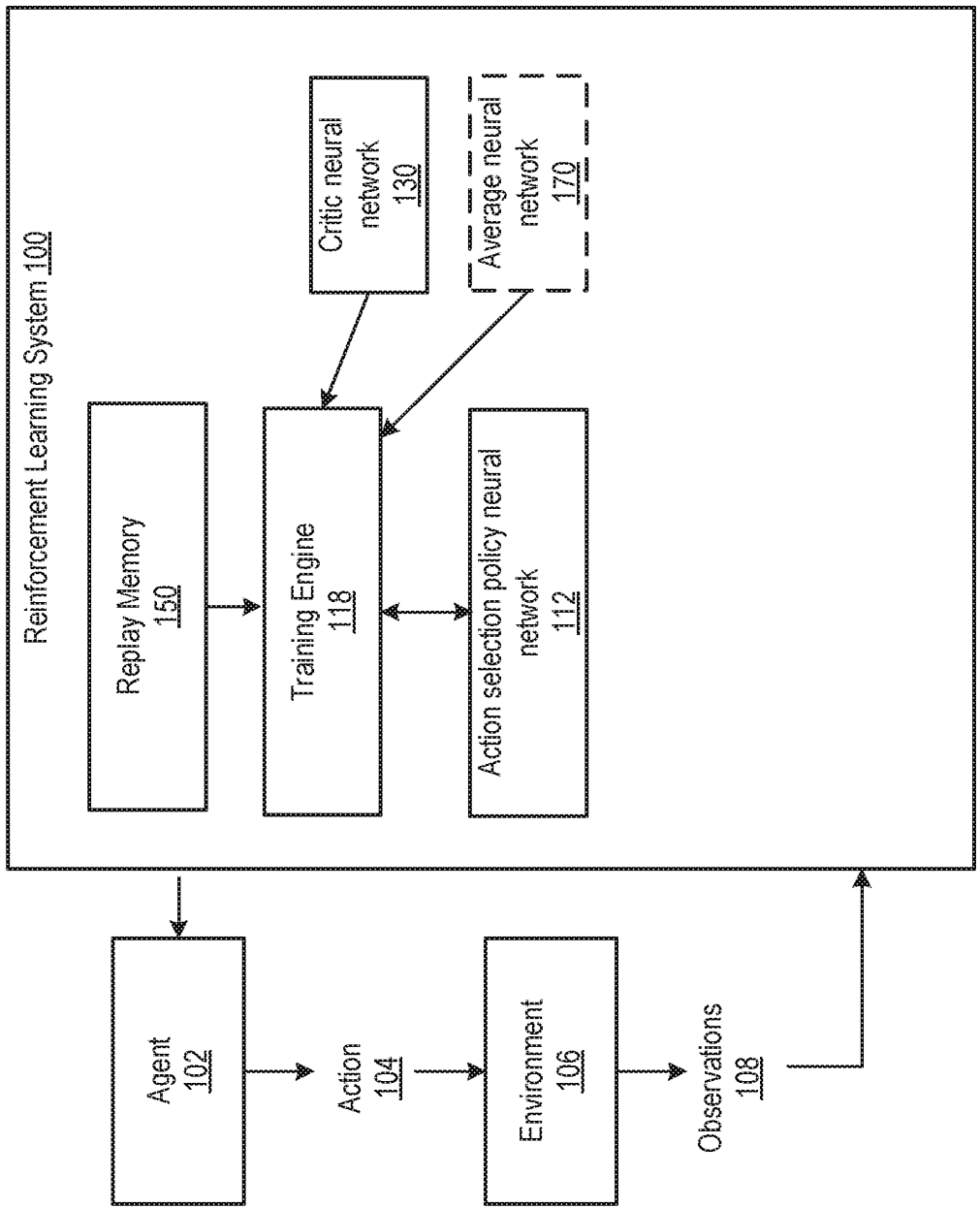
FIG. 1 shows an example reinforcement learning system.

FIG. 1 shows an example reinforcement learning system 100. The reinforcement learning system 100 is an example of a system implemented as computer programs on one or more computers in one or more locations in which the systems, components, and techniques described below are implemented.

The reinforcement learning system 100 selects actions 104 to be performed by an agent 102 interacting with an environment 106 at each of multiple time steps. In order for the agent 102 to interact with the environment 106, the system 100 receives an observation 108 characterizing the current state of the environment 106 and selects an action 104 to be performed by the agent 102 in response to the received observation 108.

In some implementations, the environment 106 is a simulated environment and the agent 102 is implemented as one or more computer programs interacting with the simulated environment by navigating through the simulated environment. For example, the simulated environment may be a video game and the agent 102 may be a simulated user playing the video game by navigating through the simulated environment. As another example, the simulated environment may be a motion simulation environment, e.g., a driving simulation or a flight simulation, and the agent 102 is a simulated vehicle navigating through the motion simulation environment. In these cases, the actions 104 may be control inputs to control the simulated user or simulated vehicle and the observations can include images of the simulated environment, features characterizing the state of the simulated user or simulated vehicle, or both.

In some other implementations, the environment 106 is a real-world environment and the agent 102 is a mechanical agent interacting with the real-world environment. For example, the agent 102 may be an autonomous or semi-autonomous vehicle navigating through the environment. In these cases, the actions 104 may be control inputs to control the robot or the autonomous vehicle and the observations can include images captured by sensors of the mechanical agent, other sensor data captured by other sensors of the mechanical agent.

At each time step during the interaction of the agent 102 with the environment 106, the system 100 uses an action selection policy neural network 112 to select the action to be performed by the agent 102 in response to the observation 108 at the time step.

In particular, the action selection policy neural network 112 is configured to receive an input including an observation 108 and to process the input in accordance with a set of parameters of the action selection policy neural network, referred to in this specification as policy parameters, to generate a network output that the system 100 uses to determine an action 104 to be performed by the agent 102 at the time step. The network output defines a score distribution over possible actions that can be performed by the agent to interact with the environment in response to the observation.

In some cases, the set of possible actions that can be performed by the agent is finite, i.e., the system selects from a pre-determined finite, discrete set of actions at each time step. In these cases, i.e., when the set of possible actions that can be performed is finite, the network output is a score distribution over the set of possible actions.

In other cases, the set of possible actions is not finite, e.g., actions are represented by points in a continuous action space. For example, the actions may be torques applied to various joints of a mechanical agent that can be any real value in some predetermined range. In cases where the space of possible actions is continuous, the network output can be parameters, e.g., mean and covariance parameters, of a distribution over the possible actions.

In order for the action selection policy neural network 112 to be effectively used to select actions to be performed by the agent, a training engine 118 trains the action selection policy neural network 112 to generate policy outputs that maximize the expected cumulative reward received by the system 100, e.g., a long-term time-discounted sum of rewards received by the system 100, as a result of interactions by the agent with the environment.

In particular, during the training, the system 100 stores trajectories generated as a result of interactions of the agent with the environment in a replay memory 150. Each trajectory in the replay memory 150 includes respective action selection data at each of multiple time steps. For example, each trajectory in the replay memory 150 may include the same fixed number of time steps. The trajectory data at a given time step identifies: (i) an observation characterizing a state of the environment, (ii) an action performed by the agent in response to the observation, (iii) a reward received in response to the agent performing the action, and (iv) the score distribution for the actions in the set of actions that was used in determining which action to perform in response to the observation. This distribution will be referred to in this specification as an action score distribution.

In particular, the system 100 uses the action selection policy neural network 112 to select the actions that are performed by the agent to generate the trajectories that are stored in the replay memory 150. However, because the values of the policy parameters change during the training, it may not be possible for the system 100 to re-generate the same score distribution that was previously generated by the action selection policy neural network 112 for a given observation at the time at which the system 100 samples the trajectory from the replay memory 150. In order for the system 100 to track the scores that were generated for previously performed actions, the system 100 stores the action score distribution (or parameters defining the action score distribution) in the replay memory 150.

To train the action selection policy neural network 112, the training engine 118 samples trajectories from the replay memory 150 and trains the action selection policy neural network 112 on the sampled trajectories using an off-policy actor-critic reinforcement learning technique. As part of the actor-critic technique, the training engine 118 trains the action selection policy neural network 112 jointly with a critic neural network 130.

Generally, the critic neural network 130 is a neural network having a set of parameters, referred to in this specification as critic parameters. When the set of actions is finite, the critic neural network is configured to receive an observation and to process the observation to generate an output that defines a respective Q value for each action in the set of actions. The Q value for a given action is an estimate, according to the current values of the critic parameters, of the cumulative reward that would be received by the system 100 if the agent performed the given action in response to the observation.

When the set of actions is finite, the critic neural network 130 and the action selection policy neural network 112 can share some parameters. For example, the critic neural network 130 and the action selection policy neural network 112 can be a single neural network with two heads, one that outputs the Q values for the actions and another that outputs the score distribution. This neural network may include, for example, a convolutional neural network and/or a recurrent neural network.

Training the action selection policy neural network 112 (and the critic neural network 130) when the set of actions is finite is described in more detail below with reference to FIGS. 2 and 3.

When the set of actions is not finite, for example in a continuous action space, the critic neural network 130 can be a stochastic dueling neural network. A stochastic dueling neural network is a neural network that generates deterministic value estimates for states characterized by input observations while also generating stochastic Q values. In particular, the stochastic dueling neural network is configured to receive an input observation, an action of interest, and n actions sampled from a probability distribution over the set of possible actions. For example, the n actions can be sampled from a probability distribution defined by the output of the action selection policy neural network 112.

The stochastic dueling neural network is configured to process the observation to generate the deterministic value estimate for the state characterized by the observation. The value estimate is an estimate of the cumulative reward received starting from the environment being in the state characterized by the observation if actions to be performed by the agent are selected using the action selection policy neural network 112.

The stochastic dueling neural network is also configured to process the observation, the action of interest, and the n actions sampled from the probability distribution to generate a respective advantage estimate for each of the actions. An advantage estimate for a given action is a relative measure of importance of the action, i.e., how much cumulative reward will be received if the action is preformed relative to how much cumulative reward will be received if other actions are performed.

The stochastic dueling neural network then combines the value of the state, and the advantage estimates to generate the stochastic Q value for the action of interest. The Q value is stochastic because during different processing iterations, the n actions that are sampled may be different, resulting in different Q values being generated for the same action of interest. In particular, the Q value for the action of interest $a_t$ in response to an observation $x_t$ satisfies:

$$\tilde{Q}_{\theta'_v}(x_t, a_t) = V(x_t) + A(x_t, a_t) - \frac{1}{n}\sum_{i=1}^{n} A(x_t, u_i),$$

where $V(x_t)$ is the value estimate for the state characterized by the observation, $A(x_t, a_t)$ is the advantage estimate for the action of interest, and $A(x_t, u_i)$ is the advantage estimate for the i-th sampled action.

Training the action selection policy neural network 112 (and the critic neural network 130) when the set of actions is not finite, i.e., the space of possible actions is continuous, is described in more detail below with reference to FIGS. 4 and 5.

In some implementations, to assist in the training of the action selection policy neural network 112, the system 100 maintains an average neural network 170. The average neural network 170 is a network that generates the same kind of output and has the same architecture as the action selection policy neural network 112, but has different parameter values from those of the action selection policy neural network 112 during the training of the action selection policy neural network 112. In particular, during the training, the system 100 updates the values of the parameters of the average network so that they represent a moving average of the policy parameters. The parameters of the average neural network will be referred to in this specification as "average network parameters." Using the average network during training will be described below with reference to FIGS. 2-6.

Figure 2:
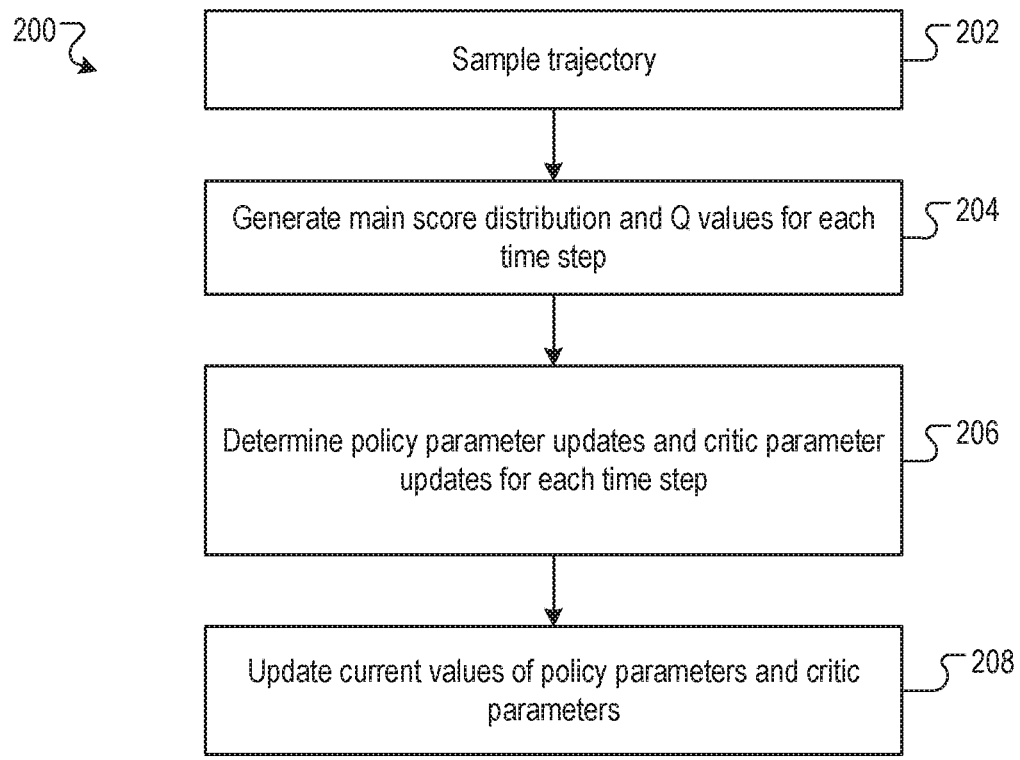
FIG. 2 is a flow diagram of an example process for training the action selection policy neural network when the set of possible actions to be performed by the agent is finite.

FIG. 2 is a flow diagram of an example process 200 for training the action selection policy neural network when the set of possible actions to be performed by the agent is finite. For convenience, the process 200 will be described as being performed by a system including one or more computers located in one or more locations. For example, a reinforcement learning system, e.g., the reinforcement learning system 100 of FIG. 1, appropriately programmed in accordance with this specification, can perform the process 200.

The system samples a trajectory from the replay memory (step 202). As described above, the trajectory includes respective action selection data at each of a plurality of time steps.

For each time step in the trajectory starting from the last time step, the system processes the observation at the time step using the action selection policy neural network in accordance with current values of the policy parameters to generate a main score distribution for the time step and processes the observation at the time step using the critic neural network to generate a set of Q values for the actions for the time step (step 204).

If the system is using an average neural network for the training, the system also processes the observation at the time step using the average neural network in accordance with current values of the average network parameters to generate an auxiliary score distribution for the time step.

The system determines a respective action selection parameter update and a respective critic parameter update for each of the time steps using the main score distributions for the time steps, the sets of Q values for the time steps and, if generated, the auxiliary score distributions for the time steps (step 206). Determining these updates for a given time step is described in more detail below with reference to FIG. 3.

The system updates the current values of the policy parameters and the current values of the critic parameters using the action selection parameter updates and the critic parameter updates for the time steps (208), i.e., by adding each update to the corresponding set of parameters.

If the system is using an average neural network, the system updates the current values of the average network parameters using the updated values of the policy parameters to determine updated values of the average network parameters. In particular, the updated values of the average network parameters may be a weighted sum of the current values of the average network parameters and the updated values of the updated values of the policy parameters. A weight for combining these values can be selected to control the influence of the average neural network on the update of the policy parameters and hence provide a "soft" update.

The system can repeatedly perform the process 200 for different trajectories sampled from the replay memory to train the action selection policy neural network, i.e., to determine trained values of the policy parameters from initial values of the policy parameters.

Figure 3:
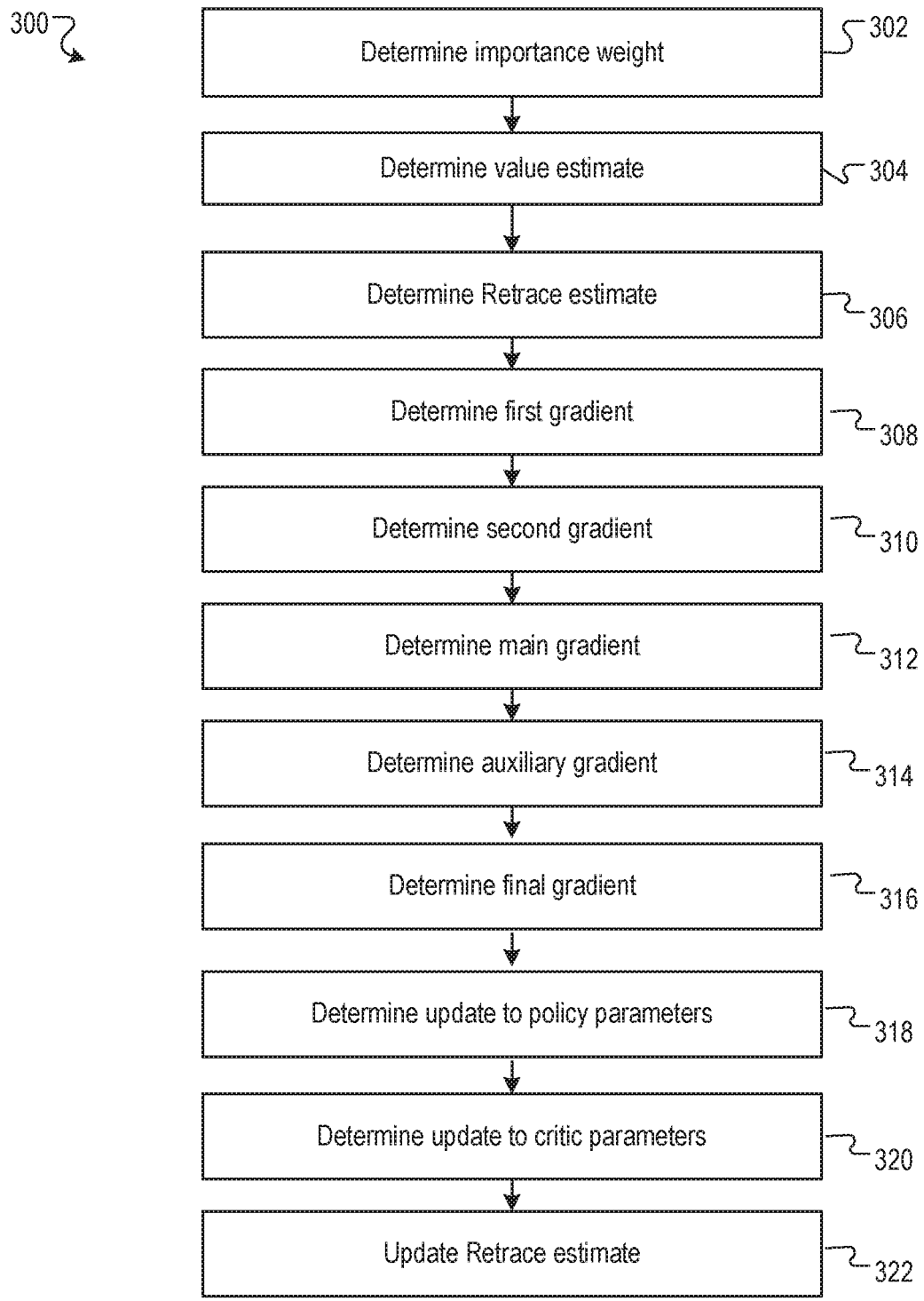
FIG. 3 is a flow diagram of an example process for determining an action selection parameter update and a critic parameter update for a time step when the set of possible actions to be performed by the agent is finite.

FIG. 3 is a flow diagram of an example process 300 for determining an action selection parameter update and a critic parameter update for a time step when the set of possible actions to be performed by the agent is finite. For convenience, the process 300 will be described as being performed by a system including one or more computers located in one or more locations. For example, a reinforcement learning system, e.g., the reinforcement learning system 100 of FIG. 1, appropriately programmed in accordance with this specification, can perform the process 300.

The system performs the process 300 for each time step in the trajectory, starting from the last time step in the trajectory and continuing until the first time step in the trajectory.

The system determines an importance weight for the time step (step 302) from the score for the action performed at the time step in the main score distribution for the time step and the action selection score for the performed action in the action selection distribution for the time step, i.e., the distribution identified in the action selection data for the time step.

In particular, the system determines the importance weight by dividing the score for action performed at the time step in the main score distribution by the action selection score in the action selection distribution.

The system also determines a truncated importance weight for the time step as the minimum of a positive constant, e.g., one, and the importance weight.

The system determines a value estimate for the time step (step 304) from the Q values and the main score distribution for the time step. In particular, the system determines a weighted sum of the Q values with each Q value being weighted by the score for the corresponding action in the main score distribution.

The system determines a Retrace estimate for the time step by multiplying a current Retrace estimate by a discount factor and adding the reward for the time step to the product (step 306). The current Retrace estimate is the Retrace estimate after the preceding iteration of the process 300. For the first iteration of the process, i.e., for the last time step in the trajectory, the system sets the current Retrace estimate to zero. Generally, the Retrace estimate is an estimate of a target Q value for the time step, i.e., an estimate of the Q value that should have been generated by the critic network by processing the observation at the time step.

The system determines a first gradient for the time step that is based on the performed action at the time step (step 308). In particular, the first gradient term satisfies:

$$\min\{c, p_i\} \nabla_{\varphi_{\theta'}(x_i)} \log f(a_i | \varphi_{\theta'}(x_i))(Q^{ret} - V_i),$$

where $p_i$ is the truncated importance weight for the time step, the gradient is taken with respect to $\varphi_{\theta'}(x_i)$, which is the output of the action policy network that defines the main score distribution, f is the main score distribution score for the time step, $a_i$ is the action performed at the time step, $Q^{ret}$ is the Retrace estimate for the time step, and $V_i$ is the value estimate for the time step.

The system determines a second gradient for the time step that is based on all of the actions in the set of actions (step 310). Generally, the second gradient term can be viewed as a correction term for the first gradient term. In particular, the second gradient satisfies:

$$\sum_a \min\left\{0, 1 - \frac{c}{p_i(a)}\right\} f(a | \varphi_{\theta'}(x_i))$$

$$\nabla_{\varphi_{\theta'}(x_i)} \log f(a | \varphi_{\theta'}(x_i))(Q_{\theta'_v}(x_i, a_i) - V_i),$$

where the sum is a sum over all of the actions a in the finite set of actions, $p_i(a)$ is the importance weight for the action a, i.e., the ratio between the score for the action a in the main score distribution and the score for the action a in the action score distribution, $f(a|\varphi_{\theta'}(x_i))$ is the score for the action a in the main score distribution, and $Q_{\theta'_v}(x_i, a_i)$ is the Q value for the performed action.

The system determines a main gradient for the time step from the first gradient and the second gradient (step 312), e.g., by adding the first gradient term and the second gradient term.

In implementations where the system uses an average network, the system determines an auxiliary gradient of a measure of difference between the auxiliary score distribution for the time step and the main score distribution for the time step (step 314). In particular, the auxiliary gradient can be equal to the gradient with respect to the main distribution, i.e., the output of the action policy neural network, of the KL divergence between (i) the auxiliary score distribution and (ii) the main score distribution.

The system determines a final gradient from the main gradient and the auxiliary gradient (step 316). In particular, the system determines, from the main gradient and the auxiliary gradient, a scaling factor for the main gradient and then applies the scaling factor to the main gradient to generate the final gradient. For example, the scaling factors can satisfy:

$$s = \max\left\{0, \frac{k^T g - \delta}{\|k\|_2^2}\right\} k,$$

where k is the auxiliary gradient, g is the main gradient, and δ is a constant value. The system can then apply the scaling factor by subtracting the scaling factor from the main gradient.

The system determines an update to the current values of the policy parameters from the final gradient (step 318).

In particular, the system can backpropagate the final gradient through the action selection policy neural network to determine a gradient with respect to the parameters of the action selection policy neural network that is used to update the current values of the policy parameters.

In implementations where the system does not use an average neural network, the system can use the main gradient as the final gradient or can scale the main gradient using some other technique, e.g., a trust region technique that limits the per-step changes to the parameters. An example of such a technique is the Trust Region Policy Optimization (TRPO) technique described in Schulman, et al, J. Schulman, S. Levine, P. Abbeel, M. I. Jordan, and P. Moritz. Trust region policy optimization, in ICML, 2015.

The system determines an update to the current values of the critic parameters that uses the Retrace estimate as the target Q value (step 320). In particular, the update to the critic parameters can satisfy:

$$\nabla_{\theta'_v}(Q^{ret} - Q_{\theta'_v}(x_i, a_i))^2$$

where $\theta'_v$ are the critic parameters.

The system updates the Retrace estimate before the estimate is used in the next iteration of the process 300 (step 322). For example, the updated Retrace estimate can satisfy:

$$\bar{p}_i(Q^{ret} - Q_{\theta'_v}(x_i, a_i)) + V_i,$$

where $\bar{p}_i$ is the truncated importance weight.

The system then uses the updated Retrace estimate as the current estimate for the next iteration of the process 300.

Figure 4:
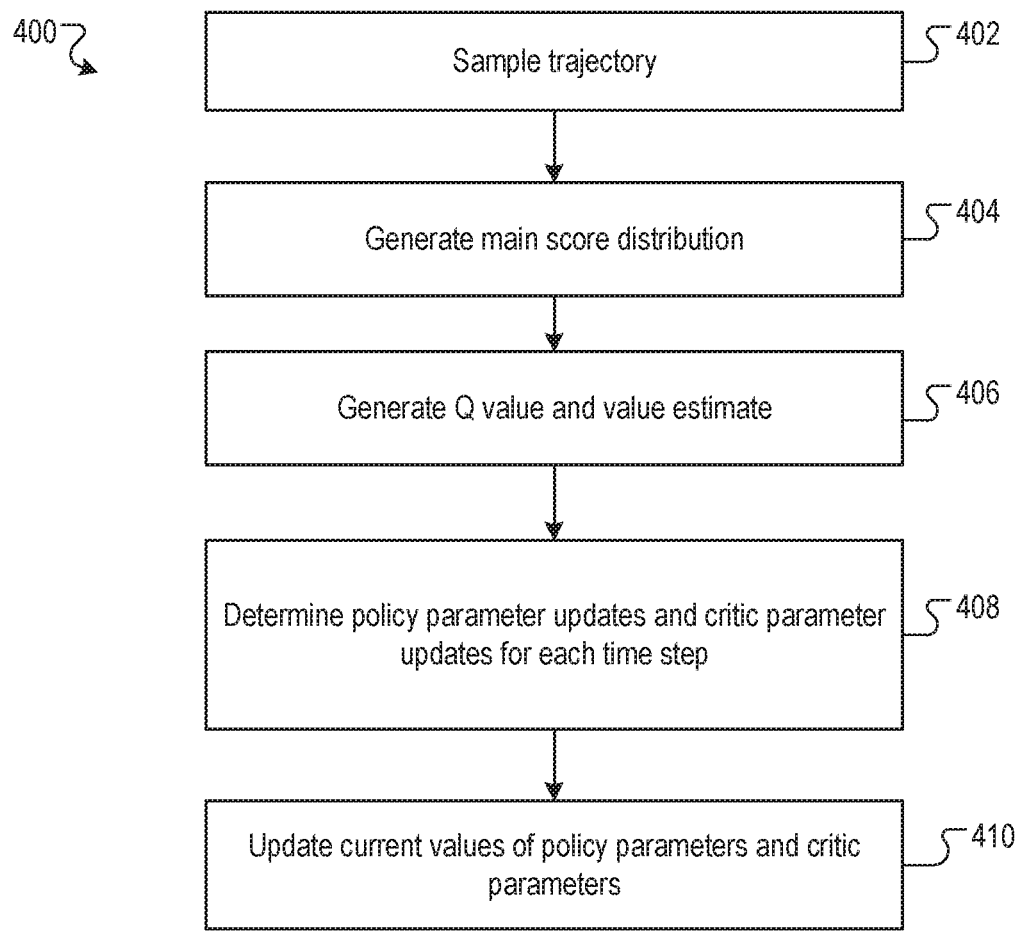
FIG. 4 is a flow diagram of an example process for training the action selection policy neural network when the set of possible actions to be performed by the agent is not finite.

FIG. 4 is a flow diagram of an example process 400 for training the action selection policy neural network when the set of possible actions to be performed by the agent is not finite, i.e., when the actions are selected from a continuous action space. For convenience, the process 400 will be described as being performed by a system including one or more computers located in one or more locations. For example, a reinforcement learning system, e.g., the reinforcement learning system 100 of FIG. 1, appropriately programmed in accordance with this specification, can perform the process 400.

The system samples a trajectory from the replay memory (step 402). As described above, the trajectory includes respective action selection data at each of a plurality of time steps.

For each time step in the trajectory, the system processes the observation at the time step using the action selection policy neural network in accordance with current values of the policy parameters to generate parameters of a main score distribution for the time step (step 404). If the system is using an average neural network for the training, the system also processes the observation at the time step using the average neural network in accordance with current values of the average network parameters to generate parameters of an auxiliary score distribution for the time step.

For each time step in the trajectory, the system processes the observation at the time step and the performed action at the time step using the critic neural network (which in this case is a stochastic dueling network) to generate a stochastic Q value for the performed action and a value estimate for the time step (step 406).

The system determines a respective action selection parameter update and a respective critic parameter update for each of the time steps using the main score distributions for the time steps, the sets of Q values for the time steps and, if generated, the auxiliary score distributions for the time steps (step 408). Determining these updates for a given time step is described in more detail below with reference to FIG. 5.

The system updates the current values of the policy parameters and the current values of the critic parameters using the action selection parameter updates and the critic parameter updates for the time steps (step 410), i.e., by adding each update to the corresponding set of parameters.

If the system is using an average neural network, the system updates the current values of the average network parameters using the updated values of the policy parameters to determine updated values of the average network parameters. In particular, the updated values of the average network parameters are a weighted sum of the current values of the average network parameters and the updated values of the policy parameters.

The system can repeatedly perform the process 400 for different trajectories sampled from the replay memory to train the action selection policy neural network, i.e., to determine trained values of the policy parameters from initial values of the policy parameters.

Figure 5:
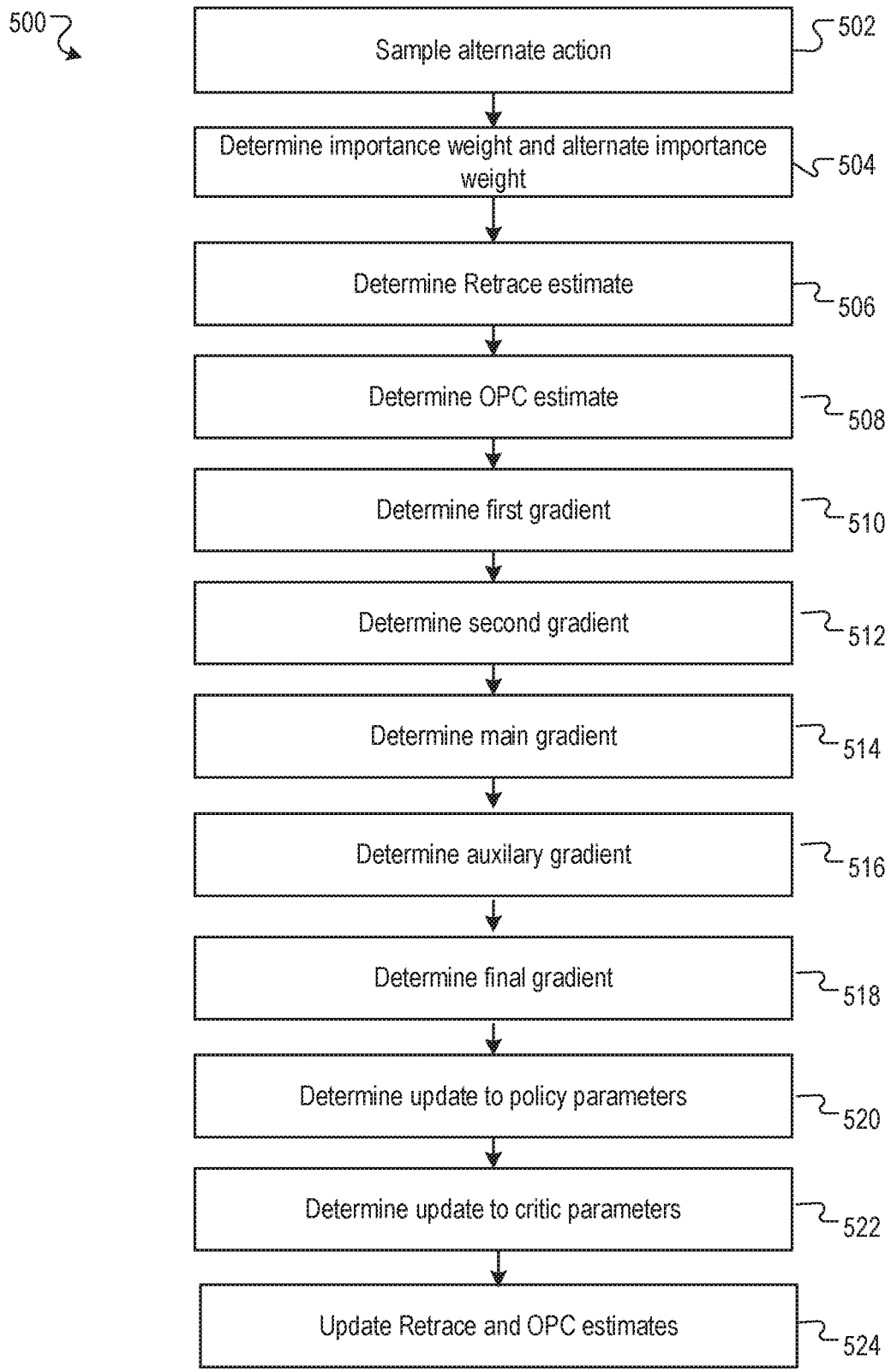
FIG. 5 is a flow diagram of an example process for determining an action selection parameter update and a critic parameter update for a time step when the set of possible actions to be performed by the agent is not finite.

FIG. 5 is a flow diagram of an example process 500 for determining an action selection parameter update and a critic parameter update for a time step when the set of possible actions to be performed by the agent is not finite. For convenience, the process 500 will be described as being performed by a system including one or more computers located in one or more locations. For example, a reinforcement learning system, e.g., the reinforcement learning system 100 of FIG. 1, appropriately programmed in accordance with this specification, can perform the process 500.

The system performs the process 500 for each time step in the trajectory, starting from the last time step in the trajectory and continuing until the first time step in the trajectory.

The system samples an alternate action from the main score distribution (step 502). That is, the system samples an alternate action from the continuous action space such that the likelihood that any given action is sampled is defined by the score for the action in the main score distribution.

The system determines an importance weight for the time step and an alternate importance weight for the time step (step 504). In particular, the system determines the importance weight by dividing (i) the score for action performed at the time step, i.e., the action identified in the action selection data for the time step, in the main score distribution for the time step by (ii) the action selection score in the action selection distribution for the time step and determines the alternate importance weight by dividing (i) the score for alternate action in the main score distribution for the time step by (ii) the score for the alternate action in the action selection distribution for the time step.

The system determines a Retrace estimate for the time step by multiplying a current Retrace estimate by a discount factor and adding the reward for the time step to the product (step 506). The current Retrace estimate is the Retrace estimate after the preceding iteration of the process 500.

The system determines an off-policy corrections (OPC) estimate by multiplying a current OPC estimate by the discount factor and adding the reward for the time step to the product (step 508). Like the current Retrace estimate, the current OPC estimate is the OPC estimate after the preceding iteration of the process 500.

For the first iteration of the process, i.e., for the last time step in the trajectory, the system sets both the current Retrace estimate and the current OPC estimate to zero.

The system determines a first gradient term for the time step that is based on the performed action at the time step (step 510). In particular, the first gradient term satisfies:

$$\min\{c, p_i\} \nabla_{\varphi_{\theta'}(x_i)} \log f(a_i | \varphi_{\theta'}(x_i))(Q^{opc} - V_i),$$

where c is a constant value, $p_i$ is the importance weight for the time step, f is the main score distribution for the time step, $a_i$ is the performed action at the time step, $\varphi_{\theta'}(x_i)$ are the parameters that are output by the action selection policy network (i.e., the parameters that define the main score distribution for the time step), $Q^{opc}$ is the OPC estimate for the time step and $V_i$ is the value estimate for the time step.

The system determines a second gradient term for the time step that is based on the alternate action sampled for the time step (512). In particular, the second gradient term satisfies:

$$\min\left\{0, 1 - \frac{c}{p_i'}\right\}(\tilde{Q}_{\theta_v'}(x_i, a_i') - V_i)\nabla_{\varphi_{\theta'}(x_i)} \log f(a_i' | \varphi_{\theta'}(x_i)),$$

where $p'_i$ is the alternate importance weight for the time step, and $\tilde{Q}_{\theta_v'}(x_i, a_i')$ is the Q value for the alternate action $a'_i$ in response the observation at the time step as generated by the stochastic dueling network.

The system determines a main gradient for the time step from the first gradient and the second gradient (step 514), e.g., by adding the first gradient term and the second gradient term.

In implementations where the system uses an average network, the system determines an auxiliary gradient of a measure of difference between the auxiliary score distribution for the time step and the main score distribution for the time step (step 516). In particular, the auxiliary gradient can be equal to the gradient with respect to the parameters of the main distribution of the KL divergence between (i) the auxiliary score distribution and (ii) the main score distribution.

The system determines a final gradient from the main gradient and the auxiliary gradient (step 518). In particular, the system determines, from the main gradient and the auxiliary gradient, a scaling factor for the main gradient and then applies the scaling factor to the main gradient to generate the final gradient. For example, the scaling factors can satisfy:

$$s = \max\left\{0, \frac{k^T g - \delta}{\|k\|_2^2}\right\}k,$$

where k is the auxiliary gradient, g is the main gradient, and δ is a constant value. The system can then apply the scaling factor by subtracting the scaling factor from the main gradient.

The system determines an update to the current values of the policy parameters from the final gradient (step 520).

In particular, the system can backpropagate the final gradient through the action selection policy neural network to determine a gradient with respect to the parameters of the action selection policy neural network that is used to update the current values of the policy parameters.

In implementations where the system does not use an average neural network, the system can use the main gradient as the final gradient or can scale the main gradient using some other technique, e.g., a trust region technique that limits the per-step changes to the parameters. An example of such a technique is the Trust Region Policy Optimization (TRPO) technique described in Schulman, et al, J. Schulman, S. Levine, P. Abbeel, M. I. Jordan, and P. Moritz. Trust region policy optimization. In ICML, 2015.

The system determines an update to the current values of the critic parameters (step 522). In particular, the update to the critic parameters can be a sum of an update of a gradient that moves the critic parameters in the direction of a target Q value and another gradient that moves the critic parameters in the direction of a target value estimate. For example, the update can satisfy:

$$(Q^{ret} - \tilde{Q}_{\theta_v'}(x_i, a_i))\nabla_{\theta_v'}\tilde{Q}_{\theta_v'}(x_i, a_i) + \min\{1, p_i\}(Q^{ret} - \tilde{Q}_{\theta_v'}(x_i, a_i))\nabla_{\theta_v'}V_{\theta_v'}(x_i),$$

where $\theta'_v$ are the critic parameters.

The system updates the Retrace estimate and the OPC estimate before the estimates are used in the next iteration of the process 500 (step 524). For example, the updated Retrace estimate can satisfy:

$$c_i(Q^{ret} - \tilde{Q}_{\theta_v'}(x_i, a_i)) + V_{\theta_v'}(x_i),$$

where $c_i$ is equal to $$\min\left\{1, (p_i)^{\frac{1}{d}}\right\}$$

and d is a constant, e.g., the dimensionality of the action space. The optional exponent of 1/d can lead to faster learning. The updated OPC estimate can satisfy:

$$(Q^{opc} - \tilde{Q}_{\theta_v'})(x_i, a_i)) + V_{\theta_v'}(x_i).$$

The system then uses the updated Retrace and OPC estimates as the current estimates for the next iteration of the process 500.

The above description has described the average network as being used only to adjust the gradients of the action selection policy neural network before the gradients are used to update the parameters of the action selection policy network. However, an average neural network can be used to improve the training of any neural network (referred to as a "main" neural network) by scaling the gradients of the main neural network before they are used to update in updated the values of the parameters of the main neural network (referred to as the "main parameters").

For example, the main neural network can be the action selection policy neural network described above or can be a different neural network that receives a different kind of network input and generates a different kind of network output.

Generally, the system can use the average neural network during the training of the main neural network by adjusting gradients based on a measure of difference between the output of the main neural network and the output of the average neural network.

The main neural network can be configured to receive any kind of digital data input and to generate any kind of score, classification, or regression output based on the input.

For example, if the inputs to the main neural network are images or features that have been extracted from images, the output generated by the main neural network for a given image may be scores for each of a set of object categories, with each score representing an estimated likelihood that the image contains an image of an object belonging to the category.

As another example, if the inputs to the main neural network are Internet resources (e.g., web pages), documents, or portions of documents or features extracted from Internet resources, documents, or portions of documents, the output generated by the main neural network for a given Internet resource, document, or portion of a document may be a score for each of a set of topics, with each score representing an estimated likelihood that the Internet resource, document, or document portion is about the topic.

As another example, if the inputs to the main neural network are features of an impression context for a particular advertisement, the output generated by the main neural network may be a score that represents an estimated likelihood that the particular advertisement will be clicked on.

As another example, if the inputs to the main neural network are features of a personalized recommendation for a user, e.g., features characterizing the context for the recommendation, e.g., features characterizing previous actions taken by the user, the output generated by the main neural network may be a score for each of a set of content items, with each score representing an estimated likelihood that the user will respond favorably to being recommended the content item.

As another example, if the input to the main neural network is a sequence of text in one language, the output generated by the main neural network may be a score for each of a set of pieces of text in another language, with each score representing an estimated likelihood that the piece of text in the other language is a proper translation of the input text into the other language.

As another example, if the input to the main neural network is a sequence representing a spoken utterance, the output generated by the main neural network may be a score for each of a set of pieces of text, each score representing an estimated likelihood that the piece of text is the correct transcript for the utterance.

As above, whenever an average neural network is used in training of a main neural network, the average neural network has the same architecture as the main neural network but different parameter values from those of the main neural network at any given point during the training. In particular, during the training, the current values of the average network parameters represent a running average of values of the main network parameters.

Figure 6:
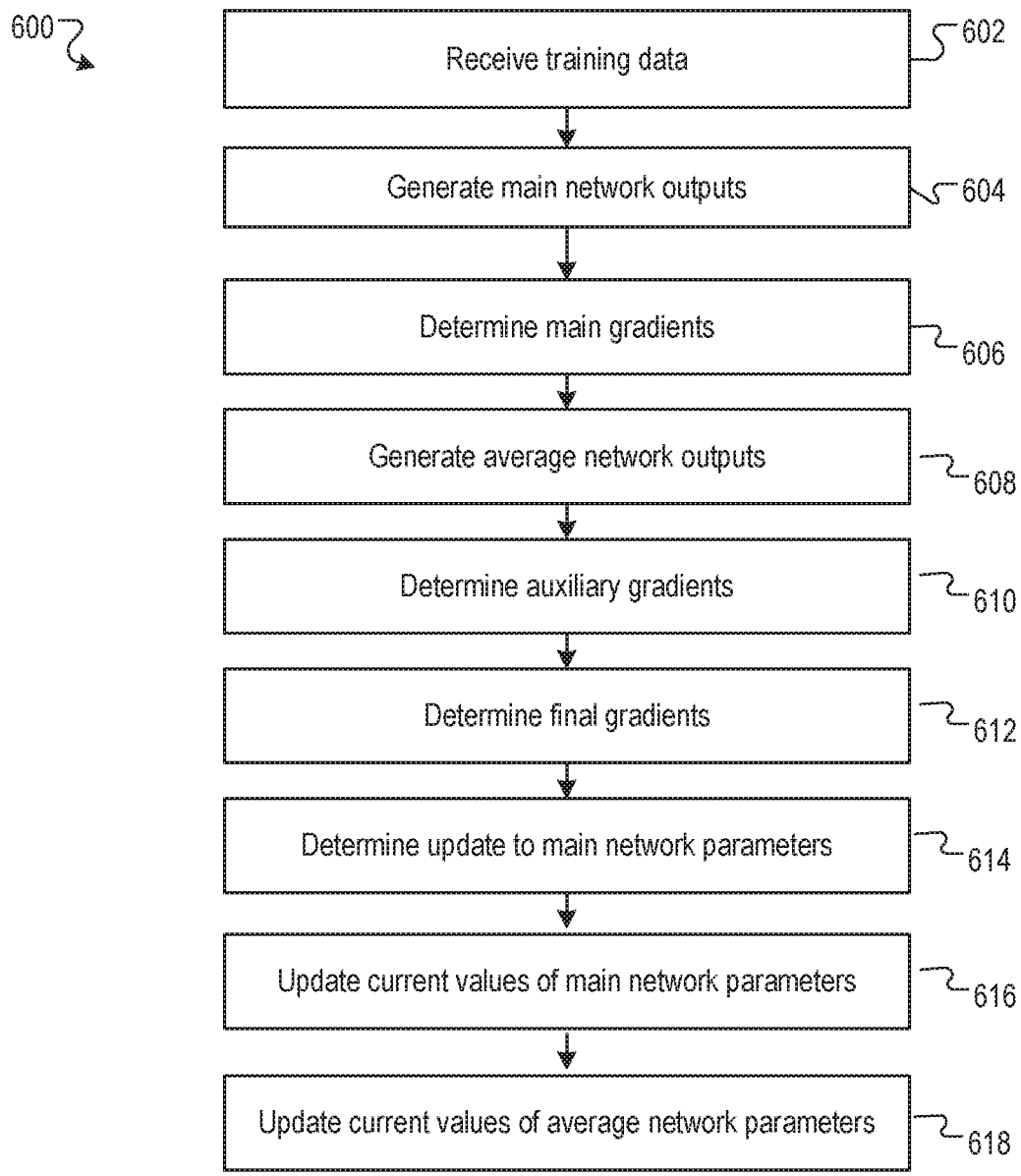
FIG. 6 is a flow diagram of an example process for training a main neural network using an average neural network.

FIG. 6 is a flow diagram of an example process 600 for training a main neural network using an average neural network. For convenience, the process 600 will be described as being performed by a system including one or more computers located in one or more locations. For example, a reinforcement learning system, e.g., the reinforcement learning system 100 of FIG. 1, appropriately programmed in accordance with this specification, can perform the process 600.

The system receives a batch of training data for use in training the main neural network to optimize an objective function (step 602). Generally, the training data includes multiple training examples and specifies, for each training example, a target output that should be generated by the main neural network for the training example. The objective function is generally a function of, for a given training example, the output generated by the main neural network for the training example and the target output for the training example. For example, the objective function can be a cross-entropy loss function or a maximum likelihood objective function.

For each of the plurality of training examples in the batch, the system processes the training example using the main neural network and in accordance with current values of the main network parameters the training example to generate a main network output for the training example (step 604).

For each of the plurality of training examples in the batch, the system determines a main gradient of the objective function from the main network output (step 606) using conventional machine learning training techniques.

For each of the plurality of training examples in the batch, the system processes the training example using the average neural network and in accordance with current values of the average network parameters to generate an average network output for the training example (step 608).

For each of the plurality of training examples in the batch, the system determines an auxiliary gradient of a measure of a difference between the average network output and the main network output (step 610). In particular, the auxiliary gradient is a gradient with respect to the main network output and the measure of the difference is a Kullback-Leibler divergence between (i) the average network output and (ii) main network output.

For each of the plurality of training examples in the batch, the system determines a final gradient from the main gradient and the auxiliary gradient (step 612). In particular, the system determines, from the auxiliary gradient and the main gradient, a scaling factor for the main gradient and applies the scaling factor to the main gradient to determine the final gradient. For example, the scaling factor s can satisfy:

$$s = \max\left\{0, \frac{k^T g - \delta}{\|k\|_2^2}\right\} k,$$

where k is the auxiliary gradient, g is the main gradient, and δ is a constant value. The system can apply the scaling factor to the main gradient by subtracting the scaling factor from the main gradient.

For each of the plurality of training examples in the batch, the system determines an update to the current values of the main network parameters from the final gradient (step 614). For example, the system can backpropagate the final gradient through the main neural network to determine an update for each of the main network parameters. Depending on the training technique being used, the system can either directly use the backpropagated gradients as the updates or can modify the backpropagated gradients to generate the update, e.g., by applying a learning rate to the backpropagated gradients.

The system updates the current values of the main network parameters using the updates for the training examples in the batch to determine updated values of the main network parameters, e.g., by adding the updates to the current values of the main network parameters (step 616).

The system updates the current values of the average network parameters using the updated values of the main network parameters to determine updated values of the average network parameters (step 618). In particular, the updated values of the average network parameters are a weighted sum of the current values of the average network parameters and the updated values of the main network parameters.

The system can repeat the process 600 multiple times on multiple different batches of training data to train the main neural network, i.e., to determine trained values of the main network parameters from initial values of the parameters.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
    maintaining a replay memory that stores trajectories generated as a result of interaction of an agent with an environment, each trajectory comprising respective action selection data at each of a plurality of time steps, the action selection data at each time step identifying:
    (i) an observation characterizing a state of the environment,
    (ii) an action performed by the agent in response to the observation,
    (iii) a reward received in response to the agent performing the action, and
    (iv) at least an action selection score assigned to the performed action in determining which action to perform in response to the observation; and
    training an action selection neural network having policy parameters on the trajectories in the replay memory, wherein the action selection neural network is configured to:
        receive a provided observation characterizing a state of the environment; and
        process the provided observation to generate a network output that defines a score distribution over possible actions that can be performed by the agent in response to the provided observation, and wherein training the action selection neural network comprises:

sampling a trajectory from the replay memory; and adjusting current values of the policy parameters by training the action selection neural network on the trajectory using an off-policy actor critic reinforcement learning technique, comprising, for each time step in the trajectory from the final time step in the trajectory to the initial time step in the trajectory:

determining, from the reward for the time step and a current Retrace estimate, a Retrace estimate for the time step; and determining a main gradient for the time step using at least the Retrace estimate for the time step.

2. The method of claim 1, wherein the set of possible actions that can be performed by the agent in response to the observation is finite, wherein the network output is the score distribution, and wherein determining the main gradient for the time step further comprises:

processing the observation for the time step using the action selection neural network to determine a main score distribution;

processing the observation for the time step using a critic neural network to determine a respective Q value for each of the possible actions; and determining the main gradient for the time step using the Q values and the main score distribution in addition to the Retrace estimate for the time step.

3. The method of claim 2, wherein determining the main gradient for the time step further comprises:

determining, from the Q values and the main score distribution, a value estimate for the time step; and determining the main gradient for the time step using the value estimate for the time step in addition to the main score distribution, the Q values, and the Retrace estimate for the time step.

4. The method of claim 3, wherein determining the main gradient for the time step further comprises:

determining a truncated importance weight from the score for the performed action in the main score distribution and the action selection score assigned to the performed action in determining which action to perform in response to the observation; and applying the truncated importance weight in determining a first term of the main gradient for the time step.

5. The method of claim 4, wherein determining the main gradient for the time step further comprises:

determining a correction gradient term from the scores in the main score distribution and action selection scores for the actions in the set of actions used in determining which action to perform in response to the observation.

6. The method of claim 3, further comprising:

determining a critic gradient from the Q value for the performed action and the current Retrace estimate;

determining an update for current values of the parameters of the critic neural network from the critic gradient; and updating the current Retrace estimate.

7. The method of claim 1, wherein adjusting current values of the policy parameters further comprises:

processing the observation for the time step using the action selection neural network to determine a main score distribution;

processing, using an average neural network having a plurality of average network parameters and in accordance with current values of the average network parameters, the observation for the time step to generate an auxiliary score distribution wherein the current values of the average network parameters represent a running average of values of the parameters of the action selection network during the training;

determining an auxiliary gradient of a measure of a difference between the auxiliary score distribution and the main score distribution;

determining a final gradient from the main gradient and the auxiliary gradient; and determining an update to the current values of the policy parameters from the final gradient.

8. The method of claim 7, wherein the measure of the difference is a Kullback-Leibler divergence.

9. The method of claim 7, wherein determining the final gradient from the main gradient and the auxiliary gradient comprises:

determining, from the auxiliary gradient and the main gradient, a scaling factor for the main gradient; and applying the scaling factor to the main gradient to determine the final gradient.

10. The method of claim 9, wherein the scaling factors satisfies:

$$s = \max\left\{0, \frac{k^T g - \delta}{\|k\|_2^2}\right\} k,$$

where k is the auxiliary gradient, g is the main gradient, and δ is a constant value.

11. The method of claim 9, wherein applying the scaling factor comprises subtracting the scaling factor from the main gradient.

12. The method of claim 7, further comprising:

updating the current values of the policy parameters using the updates for the trajectory to determine updated values of the policy parameters; and updating the current values of the average network parameters using the updated values of the policy parameters to determine updated values of the average network parameters.

13. The method of claim 12, wherein the updated values of the average network parameters are a weighted sum of the current values of the average network parameters and the updated values of the main network parameters.

14. A method of training a main neural network having a plurality of main network parameters to determine trained values of the main network parameters by optimizing an objective function, the method comprising:

receiving a batch of training data comprising a plurality of training examples; and for each of the plurality of training examples in the batch:

processing, using the main neural network in accordance with current values of the main network parameters, the training example to generate a main network output for the training example;

determining a main gradient of the objective function from the main network output;

processing, using an average neural network having a plurality of average network parameters and in accordance with current values of the average network parameters, the training example to generate an average network output for the training example, wherein the current values of the average network parameters represent a running average of values of the main network parameters during the training;

determining an auxiliary gradient of a measure of a difference between the average network output and the main network output;

determining a final gradient from the main gradient and the auxiliary gradient; and determining an update to the current values of the main network parameters from the final gradient.

15. The method of claim 14, wherein the auxiliary measure of the difference is a Kullback-Leibler divergence.

16. The method of claim 14, wherein determining the final gradient from the main gradient and the auxiliary gradient comprises:

determining, from the auxiliary gradient and the main gradient, a scaling factor for the main gradient; and applying the scaling factor to the main gradient to determine the final gradient.

17. The method of claim 16, wherein the scaling factors satisfies:

$$s = \max\left\{0, \frac{k^T g - \delta}{\|k\|_2^2}\right\} k,$$

where k is the auxiliary gradient, g is the main gradient, and δ is a constant value.

18. The method of claim 17, wherein applying the scaling factor comprises subtracting the scaling factor from the main gradient.

19. The method of claim 14, further comprising:

updating the current values of the main network parameters using the updates for the training examples in the batch to determine updated values of the main network parameters; and updating the current values of the average network parameters using the updated values of the main network parameters to determine updated values of the average network parameters.

20. The method of claim 19, wherein the updated values of the average network parameters are a weighted sum of the current values of the average network parameters and the updated values of the main network parameters.

21. A system comprising one or more computers and one or more storage devices storing instructions that when executed by the one or more computers cause the one or more computers to perform operations comprising:

maintaining a replay memory that stores trajectories generated as a result of interaction of an agent with an environment, each trajectory comprising respective action selection data at each of a plurality of time steps, the action selection data at each time step identifying:

(i) an observation characterizing a state of the environment, (ii) an action performed by the agent in response to the observation, (iii) a reward received in response to the agent performing the action, and (iv) at least an action selection score assigned to the performed action in determining which action to perform in response to the observation; and training an action selection neural network having policy parameters on the trajectories in the replay memory, wherein the action selection neural network is configured to:

receive a provided observation characterizing a state of the environment; and process the provided observation to generate a network output that defines a score distribution over possible actions that can be performed by the agent in response to the provided observation, and wherein training the action selection neural network comprises:

sampling a trajectory from the replay memory; and adjusting current values of the policy parameters by training the action selection neural network on the trajectory using an off-policy actor critic reinforcement learning technique, comprising, for each time step in the trajectory from the final time step in the trajectory to the initial time step in the trajectory:

determining, from the reward for the time step and a current Retrace estimate, a Retrace estimate for the time step; and determining a main gradient for the time step using at least the Retrace estimate for the time step.

22. A system comprising:

one or more computers; and one or more storage devices communicatively coupled to the one or more computers, wherein the one or more storage devices store instructions that, when executed by the one or more computers, cause the one or more computers to perform operations for training a main neural network having a plurality of main network parameters to determine trained values of the main network parameters by optimizing an objective function, the operations comprising:

receiving a batch of training data comprising a plurality of training examples; and for each of the plurality of training examples in the batch:

processing, using the main neural network in accordance with current values of the main network parameters, the training example to generate a main network output for the training example;

determining a main gradient of the objective function from the main network output;

processing, using an average neural network having a plurality of average network parameters and in accordance with current values of the average network parameters, the training example to generate an average network output for the training example, wherein the current values of the average network parameters represent a running average of values of the main network parameters during the training;

determining an auxiliary gradient of a measure of a difference between the average network output and the main network output;

determining a final gradient from the main gradient and the auxiliary gradient; and determining an update to the current values of the main network parameters from the final gradient.

* * * * *